July 20, 1943.  M. O. KUHN  2,325,000

WELDING APPARATUS

Original Filed June 20, 1940

INVENTOR
MAX O. KUHN

BY
ATTORNEYS

Patented July 20, 1943

2,325,000

UNITED STATES PATENT OFFICE 2,325,000

WELDING APPARATUS

Max O. Kuhn, Cuyahoga Falls, Ohio, assignor to The Firestone Tire & Rubber Company, Akron, Ohio, a corporation of Ohio Original application June 20, 1940, Serial No. 341,484. Divided and this application April 22, 1942, Serial No. 440,079

4 Claims. (Cl. 219—4)

This invention relates to welding apparatus, and more specifically it relates to improved mechanism for electric butt-welding by the Thomson process. The present application is a division of application 341,484, entitled Welding method and apparatus, filed June 20, 1940.

The invention is of primary utility in the manufacture of rims for resilient tires, and will be described with particular reference thereto, it being understood that the invention is capable of wider application and is not thereby limited to the specific illustrated embodiment.

In the manufacture of tire rims, such as the metal tire rims for pneumatic tire casing, the strip of metal is worked by pressing, hot rolling, cold rolling, or by any combination of said operations, substantially to its ultimate transverse shape and profile. Thereafter the strip is bent to circular form, and its ends butt-jointed or spliced by electric welding. Usually the welded annular rim is made to smaller diameter than its ultimate diameter, and requires subsequently to be circumferentially stretched to enlarge it to desired size. During the said stretching operation considerable difficulty has been encountered due to breaking of the weld, and considerable loss has been incurred due to the required scrapping of broken rims. The breaking of the weld has been particularly prevalent with rims made of a certain grade of steel, but since this steel is in other particulars the most desirable for the manufacture of tire rims, the solution of the problem was sought in the improving of the tensile strength of the weld.

Accordingly, the chief objects of the invention are to provide improved apparatus for forming an electrically welded connection of superior tensile strength. Other objects include the production of superior rims; the saving of time and labor in the manufacture of said rims; and to effect other savings by obviating losses arising from defective welding. Other objects will be manifest as the description proceeds.

Briefly, the improved apparatus is adapted to effect the heating of each of the rim-ends to be welded to differential temperatures throughout its area before bringing said ends forcibly together to form the weld. More specifically, in the case of butt-welding the ends of metal strips, such as tire rims the ends of the weld, that is, at the margins of the strip, are heated to a higher temperature than the temperature intermediate thereto. Thus while the ends of the weld may be heated to white heat, the intermediate region may be cherry red in color. The differential temperatures in the rim ends to be welded are concurrently produced by preventing the direct passage of electric current through the work in a local region of that portion of the work that is to be welded, the magnetic field set up by the welding current undergoing a decrease in density through said local region of the work.

Figure 1:
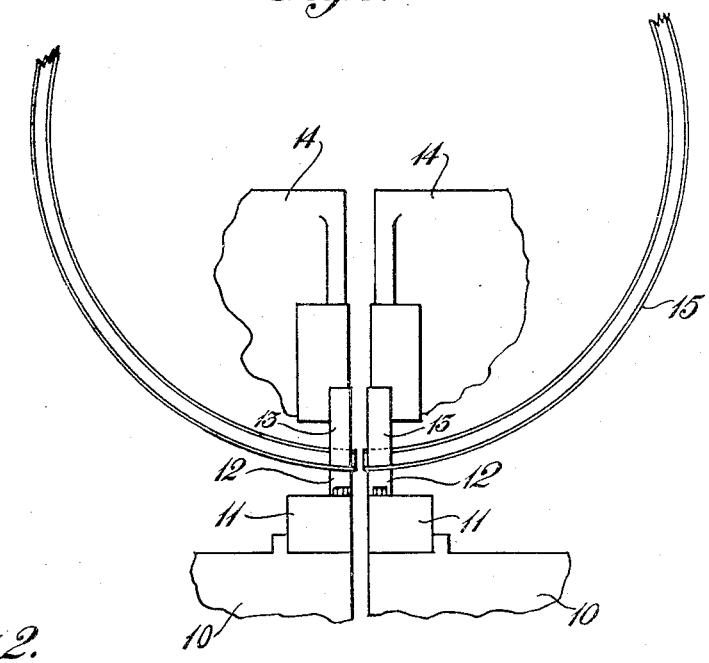
Figure 1 is a fragmentary front elevation of welding apparatus embodying the invention, and the work therein.
Figure 2:
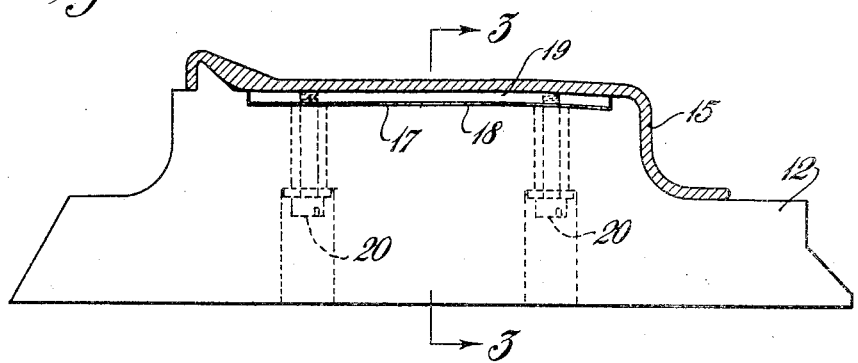
Figure 2 is a side elevation, on a larger scale, of one of the lower welding jaws, and the work, shown in section, operatively associated therewith.

Referring now to Figure 1 of the drawing, there is shown a portion of a conventional electrical apparatus comprising a pair of lower supporting members or heads 10, 10 that are shown in spaced apart relation but are movable toward each other, mounting blocks 11, 11 that are positioned atop of the respective members 10, and lower jaws or electrodes, designated as a whole by the numerals 12, 12, that are mounted upon the top of the respective blocks 11. Upper jaws or electrodes 13, 13 of the apparatus are carried by the free ends of respective arms 14, the latter being movable angularly to move the upper jaws toward or away from the lower jaws 12. The arms 14 also are movable toward each other concurrently with similar movement of the lower supporting heads 10. When the arms 14 are lowered the upper jaws 13 are in opposition to the lower jaws 12 to the end that the respective ends of a split metal ring, such as a tire rim 15 may be clamped between said jaws as shown. The work engaging faces of the jaws 12, 13 are shaped complemental to the rim-surfaces that they engage so that there is good electrical conductivity therebetween. Suitable electrical conductors (not shown) are provided for supplying electric current of low voltage and high amperage to each of the upper and lower jaws or electrodes in the usual manner.

Figure 3:
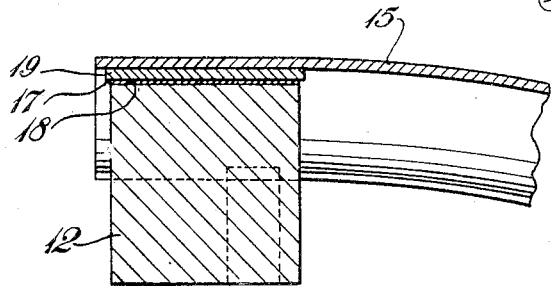
Figure 3 is a section on the line 3—3 of Figure 2.

The upper jaws 13 are of standard construction and usually are composed of steel. The lower jaws 12 are composed of copper, or other suitable metal, and differ from prior constructions in that a local region of the work engaging surface of each is so insulated that no electrical current passes directly therefrom to the work. For thus insulating each jaw 12 from the work, a layer of mica insulation 17 is provided, which layer is mounted in a recess 18 in the top face of the jaw and overlain with a wear-plate 19 of stainless steel, said members being maintained in assembled relation by screws 20 that extend through the jaw from the bottom thereof, and are suitably insulated therefrom. The arrangement is such that the wear-plate is fully insulated from the jaw 12, the upper face of the plate being flush with the adjacent work-engaging surfaces of the jaw. The wear-plate and insulation are located intermediate the ends of the work-engaging portion of the jaw, but transversely they extend completely across the jaw, or slightly beyond as shown in Figure 3. Although mica and stainless steel are used for the insulation and wear-plate respectively, these materials are not essential to the operation of the machine, and other insulating material and superior wearing metal may be provided if found expedient. Experience has shown however, that superior results are obtained when the insulated region of the jaw is as thin as possible, which phenomenon is believed to be due to the fact that the magnetic field set up by the electric current is thereby interrupted to a lesser degree.

Mechanically the apparatus is operated in the same manner as conventional welders of this type. With the pairs of jaws 12, 12 in laterally spaced position and the upper jaws 13 in elevated position, a split rim 15 is mounted in the apparatus with its ends resting upon the respective lower jaws 12 and projecting slightly beyond the confronting faces of the latter. The upper jaws 13 are then lowered so as to confine the rim-ends between themselves and the lower jaws 12 as shown in Figure 1, after which the electric current is passed through the jaws and confined rim-ends therebetween to effect the fusing of the latter. Finally the pairs of jaws are moved toward each other to effect the butt-welding of the heated projecting end portions of the rim. There after the flash or upset portion of the weld is removed by grinding or other suitable means, after which the rim is ready to be distended to ultimate diameter, as previously has been explained.

Annular articles welded according to the invention may be distended to the desired extent without rupture of the weld. It is believed that this result is due to the fact that heat generated during the fusing of the ends of the article spreads over a larger area of the said ends, thus resulting in a larger annealed area around the weld of the finished article. Evidence of this fact is visible in the finished article wherein the annealed region of the weld is of slightly different color than the non-annealed region, is wider at each end of the weld than at the intermediate region thereof, and also that the narrowest annealed region is at least as wide as the annealed portion of rims welded by conventional methods and apparatus.

The apparatus of the invention is relatively inexpensive to install, and the operation of the apparatus involves no departure from prior practice. The invention provides a superior weld, which is especially desired in the manufacture of tire rims, and achieves the other advantages set out in the foregoing statement of objects.

Modification may be resorted to without departing from the spirit of the invention or the scope thereof as defined by the appended claims, which are not limited to the specific construction shown.

What is claimed is:

1. Electric tire rim butt-welding apparatus comprising pairs of upper and lower electrodes adapted to grip work-units to be joined by welding, and means impeding the direct passage of electric current from the electrodes through the work units in local regions of the latter with which the electrodes are in contact, said means comprising recesses formed in the top faces of the said lower electrodes and extending a substantial distance across the work-gripping surface thereof, insulating material within said recesses, wear-plates overlying said recesses and being retained in position by supports extending through said insulated material, said wear-plates being insulated from said lower electrodes and being adapted to cooperate with them in gripping the work.

2. Electric tire rim butt-welding apparatus comprising pairs of electrodes adapted to grip work-units to be united by welding, and insulation locally disposed between one electrode of each pair and the work-units for impeding the direct passage of electric current therebetween, a stainless steel wear-plate overlying said insulation and being maintained in assembled relation by means of screws, said wear-plate being insulated and spaced apart from the assembly.

3. Electric butt-welding apparatus comprising pairs of upper and lower electrodes adapted to grip work-units to be joined by welding, and means impeding the direct passage of electric current from the electrodes through the work-units in local regions of the latter with which the electrodes are in contact, said means comprising recesses formed in the top faces of the said lower electrodes and extending a substantial distance across the work-gripping surface thereof, insulating material within said recess, wear-plates overlying said recesses, wear-plate supporting means, said wear-plates being insulated from said lower electrodes and being adapted to cooperate with them in gripping the work.

4. Electric butt-welding apparatus comprising pairs of electrodes adapted to grip work-units to be united by welding, and insulation locally disposed between one electrode of each pair and the work-units for impeding the direct passage of electric current therebetween, a rigid metallic wear-plate having high heat resistance characteristics overlying said insulation, wear-plate supporting means, said wear-plate being insulated and spaced apart from the assembly.

MAX O. KUHN.